United States Patent
Ono

(10) Patent No.: US 10,752,808 B2
(45) Date of Patent: Aug. 25, 2020

(54) LAMINATED THIN FILM AND METHOD FOR MANUFACTURING THE SAME

(71) Applicant: DEXERIALS CORPORATION, Tokyo (JP)

(72) Inventor: Yukihiro Ono, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 181 days.

(21) Appl. No.: 15/576,920

(22) PCT Filed: May 27, 2016

(86) PCT No.: PCT/JP2016/065724
§ 371 (c)(1),
(2) Date: Nov. 27, 2017

(87) PCT Pub. No.: WO2016/190415
PCT Pub. Date: Dec. 1, 2016

(65) Prior Publication Data
US 2018/0148609 A1    May 31, 2018

(30) Foreign Application Priority Data

May 27, 2015 (JP) .................................. 2015-107978
May 26, 2016 (JP) .................................. 2016-105680

(51) Int. Cl.
| | |
|---|---|
| G02B 1/14 | (2015.01) |
| C09J 7/22 | (2018.01) |
| B32B 7/02 | (2019.01) |
| B32B 7/12 | (2006.01) |
| B32B 9/00 | (2006.01) |
| B32B 27/20 | (2006.01) |
| G02B 1/115 | (2015.01) |

(52) U.S. Cl.
CPC ............... *C09J 7/22* (2018.01); *B32B 7/02* (2013.01); *B32B 7/12* (2013.01); *B32B 9/00* (2013.01); *B32B 27/20* (2013.01); *G02B 1/115* (2013.01); *G02B 1/14* (2015.01)

(58) Field of Classification Search
None
See application file for complete search history.

(56) References Cited

U.S. PATENT DOCUMENTS

| | | | | |
|---|---|---|---|---|
| 5,747,152 A | * | 5/1998 | Oka | .......................... B29C 70/60 428/323 |
| 5,976,297 A | | 11/1999 | Oka et al. | |
| 6,335,832 B1 | | 1/2002 | Oka et al. | |
| 2002/0051295 A1 | | 5/2002 | Oka et al. | |
| 2004/0191478 A1 | * | 9/2004 | Nishikawa | ............. G02B 1/105 428/141 |
| 2010/0172028 A1 | | 7/2010 | Kamei et al. | |
| 2016/0299260 A1 | * | 10/2016 | Ibuki | ..................... G02B 1/118 |

FOREIGN PATENT DOCUMENTS

| | | |
|---|---|---|
| CN | 101680973 A | 3/2010 |
| JP | H07-104103 A | 4/1995 |
| JP | H07-225302 A | 8/1995 |
| JP | H11-218603 A | 8/1999 |
| JP | 2004-021550 A | 1/2004 |
| JP | 2004-119188 A | 4/2004 |
| JP | 2005-283611 A | 10/2005 |
| JP | 2009-109850 A | 5/2009 |
| JP | 2012-206307 A | 10/2012 |
| JP | 2014-224920 A | 12/2014 |
| JP | 2015-054402 A | 3/2015 |
| WO | 2006/019184 A1 | 2/2006 |
| WO | 2008/123139 A1 | 10/2008 |
| WO | 2008/153139 A1 | 12/2008 |

OTHER PUBLICATIONS

Jan. 3, 2019 Office Action issued in Chinese Patent Application 201680028850.X.
Aug. 2, 2016 International Search Report issued in International Patent Application No. PCT/JP2016/065724.
Feb. 5, 2019 Office Action issued in Japanese Patent Application No. 2016-025857.
Aug. 30, 2019 Office Action issued in Chinese Patent Application No. 201680028850.X.
Sep. 10, 2019 Office Action issued in Japanese Patent Application No. 2016-025857.
Dec. 27, 2019 Examination Report issued in Taiwanese Patent Application No. 105116612.
Mar. 26, 2020 Office Action issued in Chinese Patent Application No. 201680028850.

\* cited by examiner

*Primary Examiner* — Sheeba Ahmed
(74) *Attorney, Agent, or Firm* — Oliff PLC

(57) ABSTRACT

A laminated thin film having excellent adhesion between an organic and inorganic layer and method for manufacturing the same are provided. A laminated thin film is provided with a hard coat layer having a surface on which metal oxide particles are exposed; and an adhesion layer deposited on the surface of the hard coat layer on which the metal oxide particles are exposed, the adhesion layer being constituted by a metal or metal oxide in an oxygen-deficient state of the same metal as the metal oxide particles. Thereby, the adhesion layer strongly adheres to resin of the hard coat layer and adheres even more strongly to the exposed metal oxide particles, allowing excellent adhesion.

19 Claims, 4 Drawing Sheets

LAMINATED THIN FILM AND METHOD FOR MANUFACTURING THE SAME

TECHNICAL FIELD

The present disclosure relates to a laminated thin film having excellent adhesion between an organic layer and an inorganic layer and a method for manufacturing the same. This application claims priority to Japanese Patent Application No. 2015-107978 filed on May 27, 2015 and Japanese Patent Application No. 2016-105680 filed on May 26, 2016, the entire contents of which are hereby incorporated by reference.

BACKGROUND ART

One example of a laminated thin film is an anti-reflective film in which an AR (Anti-Reflective) layer is formed by using a dry process on a hard coat layer having a relatively high surface hardness (for example, see PLT 1).

However, because the hard coat layer is an organic layer and the AR layer is an inorganic layer, achieving excellent adhesion has been difficult.

CITATION LIST

Patent Literature

PLT 1: Japanese Unexamined Patent Application Publication No. H11-218603

SUMMARY OF INVENTION

Technical Problem

The present invention has been proposed in view of such conventional circumstances, and provides a laminated thin film having excellent adhesion between an organic layer and an inorganic layer and a method for manufacturing the same.

Solution to Problem

As a result of earnest investigation, the present inventors have found that, by exposing metal oxide particles on a surface of a hard coat layer containing the metal oxide particles and depositing an adhesion layer constituted by a metal oxide in an oxygen-deficient state of the same metal as the metal oxide particles or constituted by the same metal as the metal oxide particles, adhesion between an organic layer and an inorganic layer is significantly improved.

Thus a laminated thin film according to the present disclosure includes a hard coat layer having a surface on which metal oxide particles are exposed and an adhesion layer deposited on the surface of the hard coat layer on which the metal oxide particles are exposed, the adhesion layer being constituted by a metal oxide in an oxygen-deficient state of the same metal as the metal oxide particles or constituted by the same metal as the metal oxide particles.

Furthermore a method for manufacturing a laminated thin film according to the present disclosure includes an exposing step of exposing metal oxide particles on a surface of a hard coat layer having the metal oxide particles and a depositing step of depositing an adhesion layer on the surface of the hard coat layer on which the metal oxide particles are exposed, the adhesion layer being constituted by a metal oxide in an oxygen-deficient state of the same metal as the metal oxide particles or constituted by the same metal as the metal oxide particles.

Advantageous Effects of Invention

According to the present disclosure, because the adhesion layer strongly adheres to resin of the hard coat layer and adheres even more strongly to the exposed metal oxide particles, excellent adhesion can be achieved.

DESCRIPTION OF EMBODIMENTS

Embodiments of the present invention will now be described in detail according to the following order with reference to the drawings.
1. Laminated Thin Film
2. Anti-reflective Film
3. Method for Manufacturing a Laminated Thin Film
4. Examples

1. Laminated Thin Film

Figure 1:
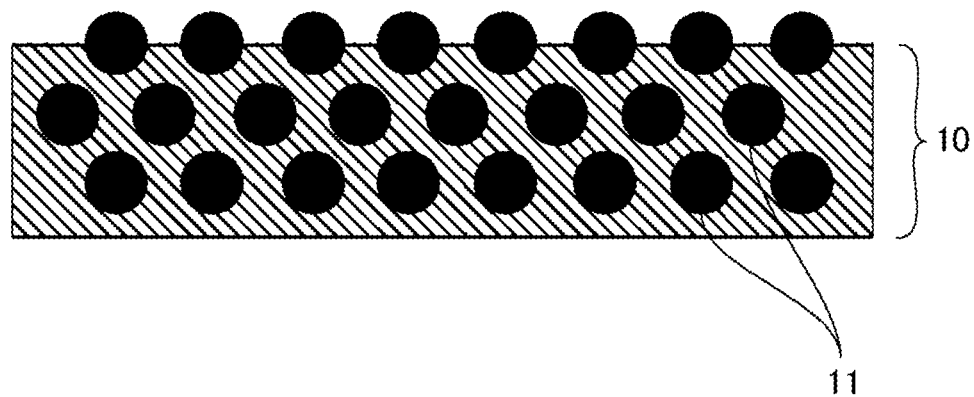
FIG. 1 is a cross-sectional view schematically illustrating a hard coat layer in which metal oxide particles are exposed according to an embodiment.
Figure 2:
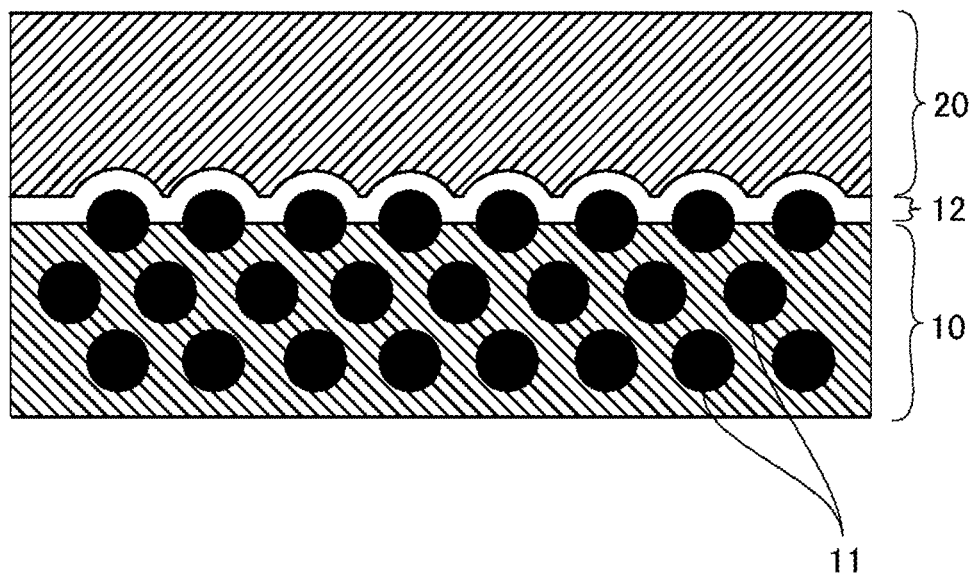
FIG. 2 is a cross-sectional view schematically illustrating a laminated thin film according to an embodiment.

FIG. 1 is a cross-sectional view schematically illustrating a hard coat layer in which metal oxide particles are exposed according to the present embodiment and FIG. 2 is a cross-sectional view schematically illustrating a laminated thin film according to the present embodiment. A laminated thin film according to the present embodiment includes a hard coat layer 10 having a surface on which metal oxide particles 11 are exposed, and an adhesion layer 12 deposited on the surface of the hard coat layer 10 on which the metal oxide particles are exposed, the adhesion layer 12 being constituted by a metal oxide in an oxygen-deficient state of the same metal as the metal oxide particles 11 or constituted by the same metal as the metal oxide particles 11. A functional layer 20 constituted by an inorganic layer deposited on the adhesion layer 12 is further included. According to such a configuration, because the adhesion layer 12 strongly adheres to resin of the hard coat layer 10 and adheres even more strongly to the exposed metal oxide particles 11, adhesion between the hard coat layer 10 and the adhesion layer 12 is improved and scratch resistance of the laminated thin film can be improved.

Hard Coat Layer

In the hard coat layer 10, the metal oxide particles 11 are dispersed in a resin material, and the metal oxide particles 11 are exposed on a surface. Examples of resin materials used in the hard coat layer 10 include ultraviolet-curable resins, electron-beam-curable resins, thermosetting resins, thermoplastic resins, and two-component type resins, among others. Among these, an ultraviolet-curable resin capable of efficiently forming the hard coat layer 10 by ultraviolet irradiation is preferably used.

Examples of ultraviolet-curable resin include those based on acrylate, urethane, epoxy, polyester, amide, and silicone, among others. Among these, for example in the case of a laminated thin film for optical use, an acrylate providing high transparency is preferably used.

The acrylic ultraviolet-curable resin is without particular limitation and bifunctional, trifunctional, or higher functional polyfunctional acrylic monomers, oligomers, and other polymer components may be selected for blending in view of hardness, adhesion, and workability, among other considerations. Moreover, a photoinitiator is blended in the ultraviolet-curable resin.

Examples of bifunctional acrylate components include polyethylene glycol (600) diacrylate, dimethylol-tricyclodecane diacrylate, bisphenol AEO-modified diacrylate, 1,9-nonanediol diacrylate, 1,10-decanediol diacrylate, propoxylated bisphenol A diacrylate, tricyclodecanedimethanol diacrylate, diethylene glycol diacrylate, neopentyl glycol diacrylate, 1,4-butanediol diacrylate, polyethylene glycol (200) diacrylate, tetraethylene glycol diacrylate, polyethylene glycol (400) diacrylate, and cyclohexane dimethanol diacrylate, among others. Commercial examples include trade name SR610 available from Sartomer Inc.

Examples of trifunctional or higher functional acrylate include pentaerythritol triacrylate (PETA), 2-hydroxy-3-acryloyloxypropyl methacrylate, isocyanuric acid EO-modified triacrylate, ε-caprolactone-modified tris-(2-acryloxyethyl) isocyanurate, trimethylolpropane triacrylate (TMPTA), and ε-caprolactone-modified tris(acroxyethyl) acrylate, among others. Commercial examples include trade name CN968 available from Sartomer Inc. and trade name SR444 available from Sartomer Inc.

Examples of photoinitiator include alkylphenone photoinitiators, acylphosphine oxide photoinitiators, and titanocene photoinitiators, among others. Commercially available examples include 1-hydroxycyclohexyl phenyl ketone (IRGACURE 184, BASF Japan Ltd.), among others.

Furthermore, in acrylic ultraviolet-curable resins, adding a leveling agent to improve smoothness and/or flatness is preferable. Examples of leveling agents include silicone-based leveling agents, fluorine-based leveling agents, and acrylate-based leveling agents; these may be used individually or in a combination of two or more. Among these, in view of coating properties, it is preferable to use a silicone-based leveling agent. Commercial examples include trade name BYK 337 (polyether-modified polydimethylsiloxane) available from BYK Japan KK, among others.

Solvents used for acrylic ultraviolet-curable resins are without particular limitation as long as coating properties are satisfactory, but are preferably selected in view of safety. Examples of solvents include propylene glycol monomethyl ether acetate, butyl acetate, methyl 3-ethoxypropionate, ethyl 3-ethoxypropionate, ethyl cellosolve acetate, ethyl lactate, methyl 3-methoxypropionate, 2-heptanone, cyclohexanone, ethyl carbitol acetate, butyl carbitol acetate, and propylene glycol methyl ether, among others; these may be used individually or in a combination of two or more. Among these, in view of coating properties, propylene glycol monomethyl ether acetate and/or butyl acetate are preferably used. In addition to the above, the acrylic ultraviolet-curable resin may contain hue adjusting agents, coloring agents, ultraviolet absorbing agents, antistatic agents, various thermoplastic resin materials, resins for adjusting refractive index, particles for adjusting refractive index, and resins for imparting adhesiveness, among other functionality-imparting resins.

The metal oxide particles 11 are particles of a metal oxide, and an average particle diameter thereof is preferably 800 nm or less, and more preferably 20 to 100 nm. Excessive average particle diameters of the metal oxide particles 11 impede use of the laminated thin film in optical applications and insufficient average particle diameters degrade adhesion between the hard coat layer 10 and the adhesion layer 12. It should be noted that in the present disclosure, average particle diameter values were measured using the BET method.

Furthermore, content of the metal oxide particles 11, with respect to total solid content of the resin composition of the hard coat layer 10, is preferably 20 to 50 wt %. Insufficient content of the metal oxide particles 11 degrades adhesion between the hard coat layer 10 and the adhesion layer 12 and excessive content degrades properties such as flexibility of the hard coat layer 10. It should be noted that solid content of the resin composition means all components except solvents, and liquid monomer components are meant to be included.

Examples of the metal oxide particles 11 include those of $SiO_2$ (silica), $Al_2O_3$ (alumina), $TiO_2$ (titania), $ZrO_2$ (zirconia), $CeO_2$ (ceria), MgO (magnesia), ZnO, $Ta_2O_5$, $Sb_2O_3$, $SnO_2$, and $MnO_2$, among others. Among these, a silica having high transparency is preferably used when, for example, using the laminated thin film in an optical application. Commercial examples include trade name IPA-ST-L (silica sol) available from NISSAN CHEMICAL INDUSTRIES, LTD. Furthermore, a functional group such as an acryl or epoxy group may be provided on surfaces of the metal oxide particle to improve adhesion and affinity with resin.

As illustrated in FIG. 1, the metal oxide particles 11 are exposed and protrude from a surface of the hard coat layer 10. As described below, the method used to expose the metal oxide particles 11 is without particular limitation so long as the method is capable of selectively etching resin of the hard coat layer 10, examples of usable methods include glow discharge processing, plasma processing, ion etching, and alkali processing, among others.

An average value of a protrusion ratio with respect to the average particle diameter of the metal oxide particles 11 exposed on the surface of the hard coat layer 10 is 60% or less and more preferably 10% to 30%. Excessive protrusion ratios of the metal oxide particles 11 increase the likelihood of the metal oxide particles 11 separating from the resin, thereby degrading adhesion between the hard coat layer 10 and the adhesion layer 12, and insufficient protrusion ratios impede adhesion improvement effects.

Furthermore, the hard coat layer 10 is preferably formed by photopolymerizing an ultraviolet-curable resin containing a urethane (meth)acrylate oligomer, a trifunctional or higher functional (meth)acrylate monomer, a bifunctional (meth)acrylate monomer, and a photoinitiator. By using such a photocurable resin composition, excellent hardness in the hard coat layer 10 can be achieved.

Adhesion Layer

The adhesion layer 12 is deposited on the surface of the hard coat layer 10 on which the metal oxide particles 11 are exposed, and is constituted by a metal oxide in an oxygen-deficient state of the same metal as that of the metal oxide particles 11 or constituted by the same metal as the metal oxide particles 11. Examples of metal oxides in an oxygen-deficient state include $SiO_x$, $AlO_x$, $TiO_x$, $ZrO_x$, $CeO_x$, $MgO_x$, $ZnO_x$, $TaO_x$, $SbO_x$, $SnO_x$, and $MnO_x$, among others. Herein, a metal oxide in an oxygen-deficient state means a metal oxide in a state in which the oxygen number is less than a stoichiometric composition. Examples of the metal include Si, Al, Ti, Zr, Ce, Mg, Zn, Ta, Sb, Sn, and Mn. For example, in the case of using $SiO_2$ in the metal oxide particles 11, the x in $SiO_x$ of the adhesion layer 12 is 0 or more and less than 2.0.

The degree of oxidation and film thickness of the adhesion layer 12 can be selected as appropriate depending on the functional layer 20 to be formed on the adhesion layer 12. For example, in the case of the functional layer 20 being an anti-reflective (AR) layer and using $SiO_2$ in the metal oxide particles, the x in $SiO_x$ is preferably 0 to 1.9. Moreover, film thickness of the adhesion layer 12 is preferably 50% or less of the average particle diameter of the metal oxide particles 11 exposed on the surface of the hard coat layer 10, in particular, preferably 1 to 50 nm, more preferably 1 to 30 nm, and yet more preferably 1 to 10 nm.

Functional Layer

The functional layer 20 is an inorganic layer deposited on the adhesion layer 12. Examples of the functional layer 20 include optical layers such as anti-reflective layers, retardation layers, and polarizing layers. Because such an optical layer is an inorganic layer formed by, for example, sputtering, dimensional stability with respect to temperature can be improved in comparison with organic layers.

In the laminated thin film having such a configuration, because the hard coat layer 10 and adhesion layer 12 strongly adhere together due to the metal oxide particles 11, excellent adhesion can be obtained. In particular, in the case of the average value of the protrusion ratio with respect to the average particle diameter of the metal oxide particles exposed on the surface of the hard coat layer 10 being 60% or less, and more preferably 10% to 30%, excellent adhesion can be achieved even in a light tolerance test using a xenon lamp.

2. Anti-reflective Film

Figure 3:
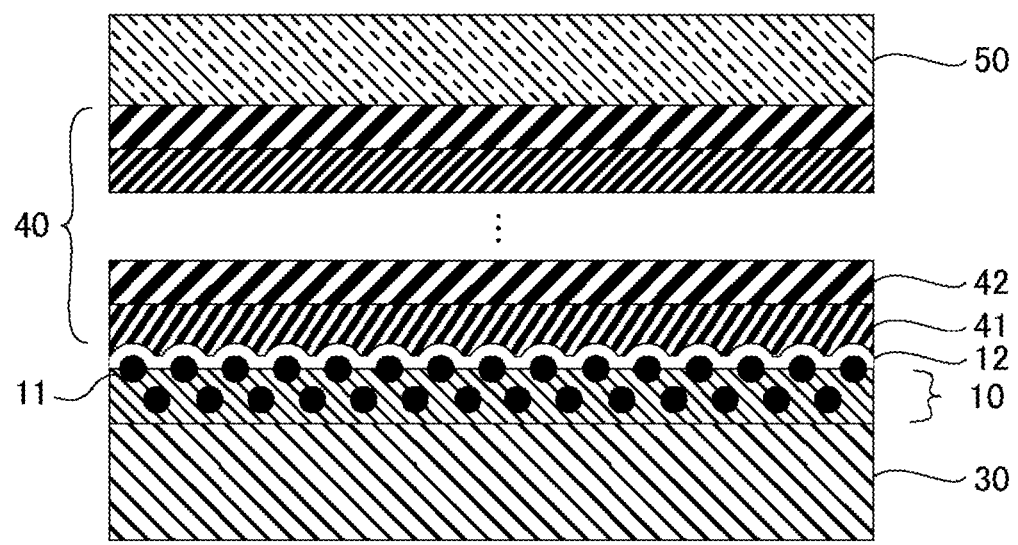
FIG. 3 is a cross-sectional view schematically illustrating an anti-reflective film to which the present invention is applied.

Next, an anti-reflective film will be described as an example of the laminated thin film described above. FIG. 3 is a cross-sectional view schematically illustrating an anti-reflective film to which the present invention is applied. As illustrated in FIG. 3, an anti-reflective film includes a matrix material 30, a hard coat layer 10 having metal oxide particles 11 exposed on a surface, an adhesion layer 12 deposited on the surface of the hard coat layer 10 on which the metal oxide particles 11 are exposed, the adhesion layer 12 being constituted by a metal or metal oxide in an oxygen-deficient state of the same metal as the metal oxide particles 11, an anti-reflective layer 40, and an antifouling layer 50.

The matrix material 30 is without particular limitation and examples include polyethylene terephthalate (PET), resin having an alicyclic structure in the main chain with cycloolefin as a monomer (COP), resin obtained by addition polymerization of cyclic olefin (for example, norbornenes) and α-olefin (for example, ethylene) (COC), and triacetyl cellulose (TAC), among others. Thickness of the matrix material 30 varies depending on the intended type and performance of the optical device to which it is applied, but is typically 25 to 200 μm, and preferably 40 to 150 μm.

The hard coat layer 10 and the adhesion layer 12 are the same as in the laminated thin film described above. In the anti-reflective film to which the present invention is applied, the metal oxide particles 11 of the hard coat layer 10 are preferably made from $SiO_2$, and the adhesion layer 12 is preferably made from $SiO_x$ (in which x is 0.5 to 1.9). Moreover, thickness of the hard coat layer 10 is normally 0.5 to 20 μm and more preferably 1 to 15 μm; the adhesion layer 12 preferably has a film thickness of 10 nm or less.

In the anti-reflective layer 40, a high refractive index layer made of a dielectric and a low refractive index layer having a lower refractive index than the high refractive index layer are deposited in alternation by sputtering. The high refractive index dielectric is preferably $Nb_2O_5$ or $TiO_2$ and the low refractive dielectric is preferably $SiO_2$.

The antifouling layer 50 is, for example, a coating layer of an alkoxysilane compound having a perfluoropolyether group. Coating an alkoxysilane compound having a perfluoropolyether group imparts water repellency with a water contact angle of 110 degrees or more, thus improving antifouling properties.

The anti-reflective film having such a configuration has excellent scratch resistance which allows favorable use as a laminated film, for example, in a touch panel. Furthermore, laminating such a touch-panel-use laminated film to an image display element such as a liquid crystal or organic EL display element enables incorporation in an image display/input device of a smartphone or personal computer.

3. Method for Manufacturing a Laminated Thin Film

A method for manufacturing a laminated thin film according to the present embodiment includes an exposing step of exposing metal oxide particles on a surface of a hard coat layer having the metal oxide particles, and a depositing step of depositing an adhesion layer on the surface of the hard coat layer on which the metal oxide particles are exposed, the adhesion layer being constituted by a metal oxide in an oxygen-deficient state of the same metal as the metal oxide particles or constituted by the same metal as the metal oxide particles. Hereinbelow, the exposing step and the depositing step will be explained.

Exposing Step

First, for example, an ultraviolet-curable resin composition is prepared by blending the metal oxide particles 11, a urethane (meth)acrylic oligomer, a trifunctional or higher functional (meth)acrylate monomer, a bifunctional (meth) acrylate monomer, and a photoinitiator, and uniformly mixing using a conventional method using a mixer such as a disperser.

The ultraviolet-curable resin composition is then coated to a matrix material. The method used for coating is without particular limitation and well-known methods may be employed. Examples of well-known methods include micro gravure methods, wire rod coating methods, direct gravure coating methods, slot-die coating methods, dip coating methods, spray coating methods, reverse roll coating methods, curtain coating methods, comma coating methods, knife coating methods, and spin coating methods, among others.

The ultraviolet-curable resin composition is then dried on the matrix material and photocured to form the hard coat layer 10. Conditions for drying are without particular limitation and drying may be under ambient conditions or artificial conditions of adjusted humidity and drying time. However, in the case of directing blown air at the application surface during drying, care must be taken to avoid generating ripple defects on the application surface. Ripple defects degrade the external appearance of the coating and generate uneven surface thickness. It should be noted that, other than photocuring the ultraviolet-curable resin composition using ultraviolet rays, other energetic radiation such as gamma rays, alpha rays, and electron beams may be employed.

Next, the surface of the hard coat layer 10 is etched and, as illustrated in FIG. 1, the metal oxide particles 11 are exposed. The method used to expose the metal oxide particles 11 is without particular limitation so long as the method can selectively etch resin of the hard coat layer 10, examples of usable methods include glow discharge processing, plasma processing, ion etching, and alkali processing, among others. Among these, it is preferable to use glow discharge processing which can process a large area.

In glow discharge processing, a processing device is used in which two opposing electrode plates are disposed in an evacuable chamber and the film travels between and parallel with the electrodes. It should be noted that this processing device may be situated within a depositing device.

The interior of the processing chamber is evacuated to a vacuum of 0.01 Pa or less before introducing an atmosphere gas. At this time, pressure within the processing chamber is without particular limitation as long as glow discharge can be maintained, but is typically 0.1 to 100 Pa. As the atmosphere gas, inert gasses are primarily used; however, hydrogen, oxygen, nitrogen, fluorine, and chlorine gasses, among others, may be used. Moreover, a mixture of these gasses may be used. Examples of inert gasses include helium, neon, argon, krypton, xenon, and radon, among others. Among these, helium and argon gas are preferable in view of availability and argon is particularly preferable in view of cost.

After introducing the atmosphere gas, a voltage of several hundred volts is applied between the opposing electrodes to generate glow discharge. By continuously passing the film through the region of glow discharge generation, the surface of the film is modified by the ionized atmosphere gas.

Intensity of glow processing can be expressed in terms of energy density (W/m$^2$) during discharge and processing time (min). Furthermore, in the case of a continuously winding device, processing time is the length (m) of the processing region (the length of electrodes in the length direction of the film) divided by the winding speed (m/min). Processing intensity is obtained by multiplying the power density (W/m$^2$) during glow discharge by the processing time and is represented by the following formula.

$$\text{processing intensity}(W*\min/m^2) = \text{power density}(W/m^2) * \text{processing region length}(m)/\text{feed rate}(m/\min)$$

Thus, by adjusting the power input and the feed rate, it is possible to produce films at different processing intensities.

The processing intensity (power*processing time/processed area, in units of W*min/m$^2$) is preferably 200 to 4,150 W*min/m$^2$ and more preferably 420 to 2,100 W*min/m$^2$. Increasing processing intensity generates more plasma on the surface of the hard coat layer, thereby increasing the protrusion ratio of the metal oxide particles 11.

The average protrusion ratio with respect to the average particle diameter of the metal oxide particles 11 is preferably 60% or less and more preferably 10% to 30%. Excessive protrusion ratios of the metal oxide particles 11 increase the likelihood of the metal oxide particles 11 separating from the resin, thereby degrading adhesion between organic layers and inorganic layers, and insufficient protrusion ratios impede adhesion improvements.

Furthermore, the arithmetical mean roughness Ra of the hard coat layer surface after etching is preferably 2 to 12 nm and more preferably 4 to 8 nm. Insufficient arithmetical mean roughness Ra of the hard coat layer 10 surface causes an inadequate protrusion ratio of the metal oxide particles 11; excessive arithmetical mean roughness Ra tends to increase the likelihood of the metal oxide particles 11 separating from the hard coat layer 10.

Depositing Step

The depositing step includes depositing an adhesion layer 12 on the surface of the hard coat layer 10 on which the metal oxide particles 11 are exposed; the adhesion layer 12 is constituted by a metal or metal oxide in an oxygen-deficient state of the same metal as the metal oxide particles 11. As the method for depositing the adhesion layer 12, sputtering using a target is preferably employed. For example, in the case of depositing an SiO$_x$ film, reactive sputtering using a silicon target under a mixed gas atmosphere of oxygen gas and argon gas is preferable. Furthermore, the functional layer 20, such as an anti-reflective layer, retardation layer, or polarizing layer, to be formed on the adhesion layer 12, can also be formed by sputtering, allowing for productivity improvements.

Thus, by depositing the adhesion layer 12 on the surface of the hard coat layer 10 on which the metal oxide particles 11 are exposed, in addition to strong adhesion between the adhesion layer 12 and resin of the hard coat layer 10, because the adhesion layer 12 adheres even more strongly to the metal oxide particles 11, excellent adhesion can be achieved.

EXAMPLES

4. Examples

In the present examples, an anti-reflective film was prepared and adhesion between a hard coat layer and an AR layer was evaluated by a cross-hatch test. It should be noted that the present invention is not limited to these examples.

4.1 First Examples

In the first examples, effect on adhesion of the protrusion ratio of filler on a surface of the hard coat layer was examined. Calculation of protrusion height and protrusion ratio of the filler on the surface of the hard coat layer, measurement of surface roughness Ra of the hard coat layer, and evaluation of a cross-hatch test of the anti-reflective film were performed as follows.

Calculation of Protrusion Height and Protrusion Ratio of Filler on Hard Coat Layer Surface A cross section of the anti-reflective film was observed using a transmission electron microscope (TEM) to measure minimum and maximum values of protrusion heights of the filler of the hard coat layer. Then, the minimum and maximum values for protrusion heights were divided by the average particle diameter of the filler to calculate a minimum value (%) and maximum value (%) of protrusion ratios with respect to the average particle diameter of the filler. Moreover, an average value (%) of protrusion ratios with respect to the average particle diameter of the filler was calculated from the minimum value (%) and the maximum value (%) of protrusions ratios with respect to the average particle diameter of the filler.

Measurement of Surface Roughness Ra of Hard Coat Layer

Arithmetical mean roughness Ra of the surface of the hard coat layer was measured using atomic force microscopy (AFM).

Evaluation of Cross-hatch Test

On the surface of the anti-reflective films, 100 cross-hatches (squares) of 1×1 mm were formed. Then, initial surface states of the cross-hatch surfaces were observed and evaluated. Furthermore, an alcohol wipe sliding test was conducted before observing and evaluating the surface state of the cross-hatch surfaces. Furthermore, test samples were subjected to a 90☐, dry (low humidity) environment for 500 hours before an alcohol wipe sliding test after which the surface state of the cross-hatch surfaces were observed and evaluated. Furthermore, test samples were subjected to a 60☐, 95% humidity environment for 500 hours before an alcohol wipe sliding test after which the surface state of the cross-hatch surfaces were observed and evaluated. Moreover, test samples were exposed to a xenon light source (xenon arc lamp, 7.5 kW) for 60 h before an alcohol wipe sliding test after which the surface state of the cross-hatch surfaces were observed. In the alcohol wipe sliding test, a wipe wetted with ethyl alcohol was pressed against the cross-hatch surfaces of the anti-reflective films under a load of 250 g/cm$^2$ and was slid back and forth 500 times over a distance of 10 cm.

Figure 4:
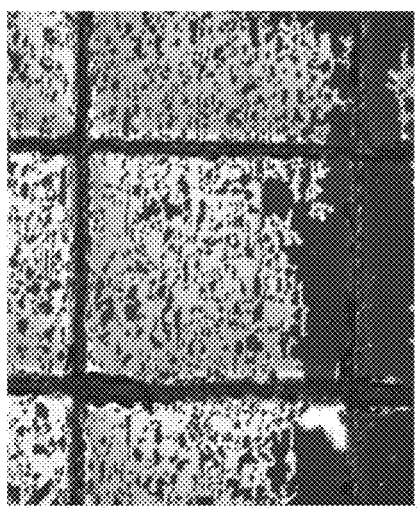
FIG. 4 is an image showing evaluation examples of a cross hatch test in cases of (A) no peeling, (B) peeling in some portions, and (C) peeling in all portions.
Figure 4:
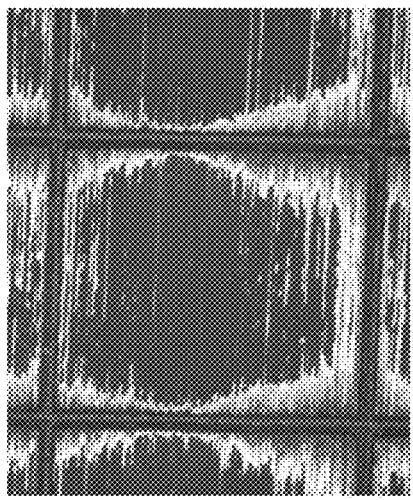
Figure 4:
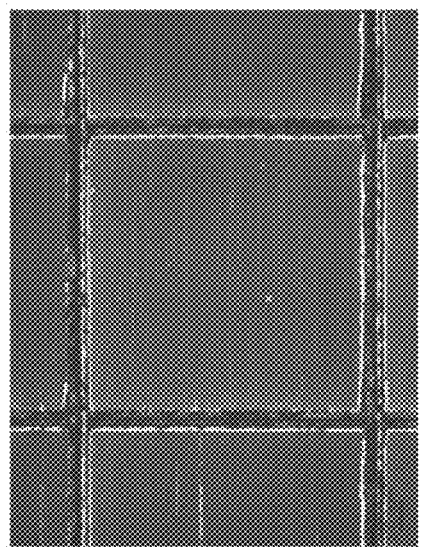

In evaluating the cross-hatch test, evaluation of the surface state of the cross-hatch surface resulted in good (hereinafter referred to as G) for cases of no peeling as in FIG. 4 (A), intermediate (hereinafter referred to as I) for cases of peeling in portions as in FIG. 4 (B), and fail (hereinafter referred to as F) for cases of peeling occurring in all portions as in FIG. 4 (C).

Example 1

A photocurable resin composition was prepared which contained silica particles having a 50 nm-average particle diameter at 28 wt % with respect to total solid content of the resin composition. As represented in Table 1, the resin composition was prepared by dissolving the silica particles, acrylate, a leveling agent, and a photoinitiator in a solvent.

TABLE

|  | product | manufacturer | composition | blend ratio |
|---|---|---|---|---|
| acrylate | CN968 | Sartomer | urethane acrylate oligomer | 8% |
|  | SR444 | Sartomer | pentaerythritol triacrylate | 7% |
|  | SR610 | Sartomer | polyethylene glycol (600) diacrylate | 11% |
| silica particles | IPA-ST-L | NISSAN CHEMICAL | 40-50 nm-diameter silica sol (solid content 30%, IPA solvent) | 37% |
| leveling agent | BYK377 | BYK | polyether-modified polydimethylsiloxane | 0.01% |
| initiator | Irgacure 184 | BASF | initiator | 1.5% |
| solvent | PGMA |  | propylene glycol monomethyl ether acetate | 30% |
|  | butyl acetate |  |  | 5% |

Using a PET film as the matrix material, the photocurable resin composition described above was coated onto the PET film using a bar coater before photopolymerizing the resin composition to form a 5 μm-thick hard coat layer.

Next, the surface of the hard coat layer was processed with glow discharge processing at an intensity of 8,300 W*min/m$^2$. Protrusion heights of the filler, protrusion ratios of the filler, and surface roughness Ra for the surface of the hard coat layer of Example 1 are represented in Table 2.

After glow discharge processing, using sputtering, a 10 nm-thick adhesion layer of SiO$_x$ was deposited, and an AR layer constituted by an Nb$_2$O$_5$ layer, an SiO$_2$ layer, an Nb$_2$O$_5$, and an SiO$_2$ layer was deposited on the adhesion layer. Furthermore, on the AR layer, a 10 nm-thick antifouling layer was formed from an alkoxysilane compound having a perfluoropolyether group, thus yielding the anti-reflective film of Example 1. This anti-reflective film had a reflectance of 0.5% or less and a water contact angle of 110 or more. Evaluation of the cross-hatch test of the anti-reflective film of Example 1 are represented in Table 2.

Example 2

Except that the intensity for processing the surface of the hard coat layer using glow discharge was 4,200 W*min/m$^2$, an anti-reflective film was prepared as in Example 1. Protrusion heights of the filler, protrusion ratios of the filler, and surface roughness Ra of the surface of the hard coat layer as well as evaluation of the cross-hatch test for the anti-reflective film of Example 2 are represented in Table 2.

Example 3

Except that the intensity for processing the surface of the hard coat layer using glow discharge was 2,100 W*min/m$^2$, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film of Example 3 are represented in Table 2.

Example 4

Except that the intensity for processing the surface of the hard coat layer using glow discharge was 830 W*min/m$^2$, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film of Example 4 are represented in Table 2.

Example 5

Except that the intensity for processing the surface of the hard coat layer using glow discharge was 420 W*min/m$^2$, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film of Example 5 are represented in Table 2.

Example 6

Except that the intensity for processing the surface of the hard coat layer using glow discharge was 200 W*min/m$^2$, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film of Example 6 are represented in Table 2.

Example 7

Except that the intensity for processing the surface of the hard coat layer using glow discharge was 420 W*min/m$^2$ and, after glow discharge processing, a 10 nm-thick adhesion layer of Si was deposited by sputtering, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film of Example 7 are represented in Table 2.

Comparative Example 1

Except that glow discharge processing was not performed, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film of Comparative Example 1 are represented in Table 2.

Comparative Example 2

Except that the silica particles were not blended in the resin composition, and the intensity for processing the surface of the hard coat layer using glow discharge was 830 W*min/m$^2$, an anti-reflective film was prepared as in Example 1. Surface roughness Ra and evaluation of the cross-hatch test for the anti-reflective film of Comparative Example 2 are represented in Table 2.

Comparative Example 3

Except that the intensity for processing the surface of the hard coat layer using glow discharge was 830 W*min/m$^2$, and the adhesion layer was formed from SiO$_2$, an anti-reflective film was prepared as in Example 1. Protrusion heights of the filler, protrusion ratios of the filler, and surface roughness Ra for the surface of the hard coat layer as well as evaluation of the cross-hatch test for the anti-reflective film for Comparative Example 3 are represented in Table 2.

In the case of not exposing the silica particles, as in Comparative Example 1, peeling occurred in all portions in the alcohol wipe sliding test. Furthermore, in the case of not blending the silica particles as in Comparative Example 2, as in Comparative Example 1, peeling occurred in all portions in the alcohol wipe sliding test. Moreover, in the case of depositing SiO$_2$ as the adhesion layer as in Comparative Example 3, as in Comparative Example 1, peeling occurred in all portions in the alcohol wipe sliding test.

Figure 5:
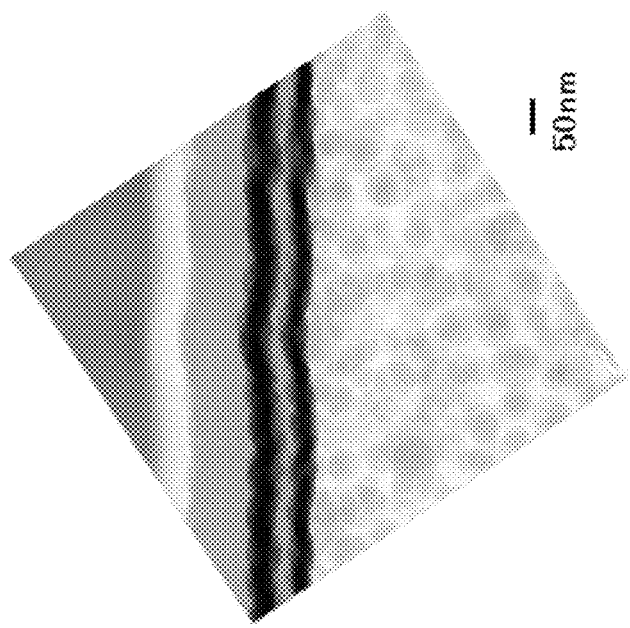
FIG. 5 (A) is an image from a TEM cross-section of Example 3 and (B) is an image from a TEM cross-section of Comparative Example 1.
Figure 5:
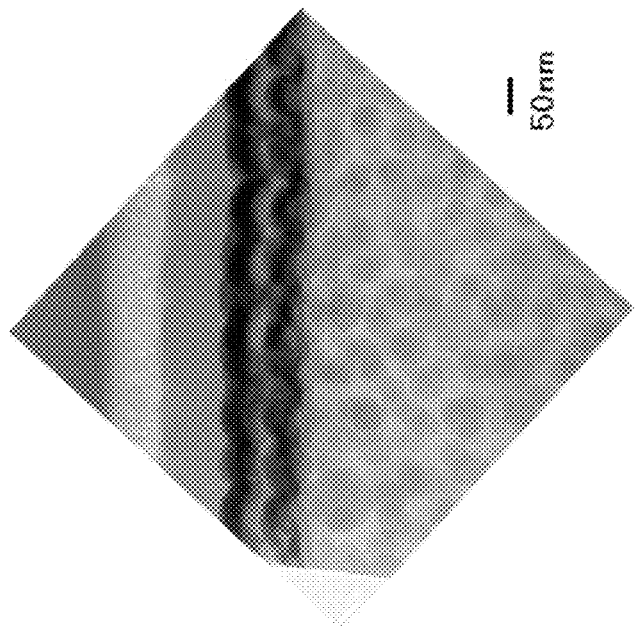

In contrast, exposing the silica particles as in Examples 1 to 7 improved adhesion in the alcohol wipe sliding test. Furthermore, when comparing the TEM cross-sectional images of Example 3 in FIG. 5(A) with the TEM cross-sectional images of Comparative Example 1 of FIG. 5(B), in Example 3, the interface between the hard coat layer and the adhesion layer is curved due to exposure of the silica particles, in contrast with the straight interface of Comparative Example 1, demonstrating that exposing the silica particles contributes to improving adhesion.

Furthermore, cases in which the average value of the protrusion ratios with respect to the average particle diameter of the metal oxide particles was 60% or less, and particularly 10% to 30%, had excellent evaluation results in the alcohol wipe sliding test.

4.2 Second Examples

In the second examples, effect on adhesion of the average particle diameter of the filler on the surface of the hard coat layer and addition amount of the filler was examined. Also examined were effects on adhesion depending on filler and adhesion layer type. Furthermore, surface processing methods other than glow discharge were examined. It should be noted that evaluation of the cross-hatch test was the same as in the first examples.

Example 8

As represented in Table 3, except that a photocurable resin composition was prepared which contained silica particles (trade name: MEK-ST-Z, NISSAN CHEMICAL INDUSTRIES, LTD.) having a 100 nm-average particle diameter at 28 wt % with respect to total solid content of the resin composition, an anti-reflective film was prepared as in Example 4. Evaluation of the cross-hatch test of Example 8 is represented in Table 3.

TABLE 2

| | adhesion layer | filler type | filler particle diameter (nm) | filler amount added (%) | filler protrusion height (nm) minimum | filler protrusion height (nm) maximum | filler protrusion ratio (%) minimum | filler protrusion ratio (%) maximum | filler protrusion ratio (%) average | AFM Ra (nm) | cross-hatch test initial | alcohol wipe sliding test 90° C.- dry- 500 hr | alcohol wipe sliding test 60° C.- 95%- 500 hr | xenon- 60 hr |
|---|---|---|---|---|---|---|---|---|---|---|---|---|---|---|
| ex. 1 | SiO$_x$ | SiO$_2$ | 50 | 28 | 25.0 | 35.7 | 50.0 | 71.4 | 60.7 | 10.7 | G | G | G | G | F |
| ex. 2 | SiO$_x$ | SiO$_2$ | 50 | 28 | 10.7 | 25.0 | 21.4 | 50.0 | 35.7 | 9.2 | G | G | G | G | I |
| ex. 3 | SiO$_x$ | SiO$_2$ | 50 | 28 | 7.1 | 21.4 | 14.2 | 42.8 | 28.5 | 7.3 | G | G | G | G | G |
| ex. 4 | SiO$_x$ | SiO$_2$ | 50 | 28 | 3.6 | 14.3 | 7.2 | 28.6 | 17.9 | 5.7 | G | G | G | G | G |
| ex. 5 | SiO$_x$ | SiO$_2$ | 50 | 28 | 2.2 | 10.9 | 4.4 | 21.8 | 10.0 | 4.1 | G | G | G | G | G |
| ex. 6 | SiO$_x$ | SiO$_2$ | 50 | 28 | 0.9 | 8.6 | 1.8 | 17.2 | 5.0 | 2.4 | G | I | I | I | I |
| ex. 7 | Si | SiO$_2$ | 50 | 28 | 2.2 | 10.9 | 4.4 | 21.8 | 10.0 | 4.1 | G | G | G | G | I |
| comp. 1 | SiO$_x$ | SiO$_2$ | 50 | 28 | 0 | 0 | 0 | 0 | 0 | 1.6 | G | F | F | F | F |
| comp. 2 | SiO$_x$ | — | — | — | — | — | — | — | — | 0.56 | G | F | F | F | F |
| comp. 3 | SiO$_2$ | SiO$_2$ | 50 | 28 | 3.6 | 14.3 | 7.2 | 28.6 | 17.9 | 5.7 | G | F | F | F | F |

Example 9

As represented in Table 3, except that a photocurable resin composition was prepared which contained silica particles (trade name: MEK-ST-40, NISSAN CHEMICAL INDUSTRIES, LTD.) having a 20 nm-average particle diameter at 28 wt % with respect to total solid content of the resin composition, an anti-reflective film was prepared as in Example 4. Evaluation of the cross-hatch test of Example 9 is represented in Table 3.

Example 10

As represented in Table 3, except that a photocurable resin composition was prepared which contained silica particles (trade name: MEK-ST-Z, NISSAN CHEMICAL INDUSTRIES, LTD.) having a 100 nm-average particle diameter at 20 wt % with respect to total solid content of the resin composition, an anti-reflective film was prepared as in Example 4. Evaluation of the cross-hatch test of Example 10 is represented in Table 3.

Example 11

As represented in Table 3, except that a photocurable resin composition was prepared which contained silica particles (trade name: MEK-ST-40, NISSAN CHEMICAL INDUSTRIES, LTD.) having a 20 nm-average particle diameter at 50 wt % with respect to total solid content of the resin composition, an anti-reflective film was prepared as in Example 4. Evaluation of the cross-hatch test of Example 11 is represented in Table 3.

Example 12

As represented in Table 3, except that a photocurable resin composition was prepared which contained silica particles (trade name: IPA-ST-L, NISSAN CHEMICAL INDUSTRIES, LTD.) having a 50 nm-average particle diameter at 20 wt % with respect to total solid content of the resin composition, an anti-reflective film was prepared as in Example 4. Evaluation of the cross-hatch test of Example 12 represented in Table 3.

Example 13

As represented in Table 3, except that a photocurable resin composition was prepared which contained silica particles (trade name: IPA-ST-L, NISSAN CHEMICAL INDUSTRIES, LTD.) having a 50 nm-average particle diameter at 50 wt % with respect to total solid content of the resin composition, an anti-reflective film was prepared as in Example 4. Evaluation of the cross-hatch test of Example 13 is represented in Table 3.

Comparative Example 4

As represented in Table 3, except that a photocurable resin composition was prepared which contained silica particles (trade name: IPA-ST-L, NISSAN CHEMICAL INDUSTRIES, LTD.) having a 50 nm-average particle diameter at 10 wt % with respect to total solid content of the resin composition, an anti-reflective film was prepared as in Example 4. Evaluation of the cross-hatch test of Comparative Example 4 is represented in Table 3.

Comparative Example 5

As represented in Table 3, except that a photocurable resin composition was prepared which contained acrylic particles (trade name: SSX-101, SEKISUI PLASTICS CO., LTD.) having a 1 μm-average particle diameter at 3 wt % with respect to total solid content of the resin composition, an anti-reflective film was prepared as in Example 4. Evaluation of the cross-hatch test of Comparative Example 5 is represented in Table 3.

Comparative Example 6

As represented in Table 3, except that, instead of glow discharge processing, corona processing was used, an anti-reflective film was prepared as in Example 4. Evaluation of the cross-hatch test of Comparative Example 6 is represented in Table 3.

Comparative Example 7

As represented in Table 3, except that, instead of glow discharge processing, alkali processing with conditions of 5% NaOH at 25□ for 30 seconds was used, an anti-reflective film was prepared as in Example 4. Evaluation of the cross-hatch test of Comparative Example 7 is represented in Table 3.

Example 14

As represented in Table 3, except that, instead of glow discharge processing, alkali processing with conditions of 5% NaOH at 45□ for two minutes was used, an anti-reflective film was prepared as in Example 4. Evaluation of the cross-hatch test of Example 14 is represented in Table 3.

Example 15

As represented in Table 3, except that, instead of glow discharge processing, alkali processing with conditions of 5% NaOH at 45□ for five minutes was used, an anti-reflective film was prepared as in Example 4. Evaluation of the cross-hatch test of Example 15 is represented in Table 3.

TABLE 3

| | | filler | | | | | cross-hatch test | | |
| | | | | | | | | alcohol wipe sliding test | |
| | adhesion layer | type | particle diameter (nm) | amount added (%) | surface processing method | initial | 90□-Dry-500 hr | 60□-95%-500 hr | xenon-60 hr |
|---|---|---|---|---|---|---|---|---|---|
| ex. 8 | $SiO_x$ | $SiO_2$ | 100 | 28 | glow discharge | G | G | I | I | F |
| ex. 9 | $SiO_x$ | $SiO_2$ | 20 | 28 | glow discharge | G | G | I | I | F |
| ex. 10 | $SiO_x$ | $SiO_2$ | 100 | 20 | glow discharge | G | G | G | G | G |
| ex. 11 | $SiO_x$ | $SiO_2$ | 20 | 50 | glow discharge | G | G | G | G | G |

TABLE 3-continued

| | adhesion layer | filler | | | cross-hatch test alcohol wipe sliding test | | | | |
|---|---|---|---|---|---|---|---|---|---|
| | | type | particle diameter (nm) | amount added (%) | surface processing method | initial | 90□-Dry-500 hr | 60□-95%-500 hr | xenon-60 hr |
| ex. 12 | SiO$_x$ | SiO$_2$ | 50 | 20 | glow discharge | G | G | G | G | G |
| ex. 13 | SiO$_x$ | SiO$_2$ | 50 | 50 | glow discharge | G | G | G | G | G |
| comp. 4 | SiO$_x$ | SiO$_2$ | 50 | 10 | glow discharge | G | F | F | F | F |
| comp. 5 | SiO$_x$ | acrylic | 1000 | 3 | glow discharge | G | F | F | F | F |
| comp. 6 | SiO$_x$ | SiO$_2$ | 50 | 28 | corona | G | F | F | F | F |
| comp. 7 | SiO$_x$ | SiO$_2$ | 50 | 28 | alkali (25□, 30 sec) | G | F | F | F | F |
| ex. 14 | SiO$_x$ | SiO$_2$ | 50 | 28 | alkali (45□, 2 min.) | G | G | I | I | I |
| ex. 15 | SiO$_x$ | SiO$_2$ | 50 | 28 | alkali (45□, 5 min.) | G | G | I | I | F |

In the case of adding an insufficient amount of silica particles as in Comparative Example 4, peeling occurred in all portions in the alcohol wipe sliding test. Furthermore, in the case of using acrylic particles as in Comparative Example 5, as in Comparative Example 4, peeling occurred in all portions in the alcohol wipe sliding test.

In contrast, in the case of containing silica particles having 20 to 100 nm-average particle diameters at 20 to 50 wt % with respect to total solid content of the resin composition, as in Examples 8 to 15, adhesion was improved. In particular, in the case of containing silica particles having 20 to 100 nm-average particle diameters at 50 to 20 wt % as in Examples 10 and 11, in the alcohol wipe sliding test performed after exposing to a xenon light source (xenon arc lamp 7.5 kW) for 60 hours, excellent adhesion was achieved.

In the case of using corona processing as the surface processing as in Comparative Example 6, peeling occurred in all portions in the alcohol wipe sliding test. Furthermore, in the case of using alkali processing with conditions of 5% NaOH at 25□ for 30 seconds as in Comparative Example 7, peeling occurred in all portions in the alcohol wipe sliding test.

In contrast, as in Examples 14 and 15, in the case of heating in the alkali process, adhesion was improved in the alcohol wipe sliding test. Furthermore, in the case of heating in the alkali processing, in comparison with the case of using glow discharge processing, evaluation results were inferior in the alcohol wipe sliding test. This is presumably because the alkali treatment is a wet treatment, which caused the shape of the interface of the hard coat layer and the adhesion layer due to exposure of the silica particles to be straight.

REFERENCE SIGNS LIST

10 hard coat layer, 11 metal oxide particles, 12 adhesion layer, 20 functional layer, 30 matrix material, 40 anti-reflective layer, 50 antifouling layer

The invention claimed is:

1. A laminated thin film comprising:
 a hard coat layer having a surface on which metal oxide particles are exposed;
 an adhesion layer deposited on the surface of the hard coat layer on which the metal oxide particles are exposed, the adhesion layer being constituted by a metal oxide in an oxygen-deficient state with the same metal as the metal oxide particles or constituted by the same metal as the metal oxide particles, and
 a functional layer being an inorganic material deposited on the adhesion layer,
 wherein the adhesion layer has a film thickness of 1 to 50 nm.

2. The laminated thin film according to claim 1, wherein an average value of a protrusion ratio with respect to an average particle diameter of the metal oxide particles exposed on the surface of the hard coat layer is 60% or less.

3. The laminated thin film according to claim 1, wherein an average value of a protrusion ratio with respect to an average particle diameter of the metal oxide particles exposed on the surface of the hard coat layer is 10% to 30%.

4. The laminated thin film according to claim 1, wherein the metal oxide particles have an average particle diameter of 20 to 100 nm.

5. The laminated thin film according to claim 1, wherein content of the metal oxide particles is 20 to 50 wt % with respect to total solid content of a resin composition of the hard coat layer.

6. The laminated thin film according to claim 1, wherein content of the metal oxide particles, with respect to metal particles having an average particle diameter of 20 to 100 nm, is 50 wt % or less and 20 wt % or more of total solid content of a resin composition.

7. The laminated thin film according to claim 1, wherein the adhesion layer has a film thickness of less than 50% of an average particle diameter of the metal oxide particles exposed on the surface of the hard coat layer.

8. The laminated thin film according to claim 1, wherein the metal oxide particles are formed from SiO$_2$, and
 wherein the adhesion layer is formed from SiO$_x$(0≤x<2).

9. The laminated thin film according to claim 1, further comprising an anti-reflective layer on the adhesion layer in which a high refractive index layer and a low refractive index layer having a lower refractive index than the high refractive index layer are alternately laminated.

10. The laminated thin film according to claim 1, wherein the hard coat layer is formed by photopolymerizing an ultraviolet-curable resin containing a urethane (meth)acrylate oligomer, a trifunctional or higher functional (meth)acrylate monomer, a bifunctional (meth)acrylate monomer, and a photoinitiator.

11. A method for manufacturing a laminated thin film comprising:
 an exposing step of exposing metal oxide particles on a surface of a hard coat layer having the metal oxide particles;
 a depositing step of depositing an adhesion layer which has a film thickness of 1 to 50 nm on the surface of the hard coat layer on which the metal oxide particles are exposed, the adhesion layer being constituted by a metal oxide in an oxygen-deficient state with the same metal as the metal oxide particles or constituted by the same metal as the metal oxide particles, and a depositing step of depositing a functional layer being an inorganic material deposited on the adhesion layer.

12. The method for manufacturing a laminated thin film according to claim 11, wherein the metal oxide particles are exposed by glow discharge processing in the exposing step.

13. The laminated thin film according to claim 2, wherein the metal oxide particles have an average particle diameter of 20 to 100 nm.

14. The laminated thin film according to claim 2, wherein content of the metal oxide particles is 20 to 50 wt % with respect to total solid content of a resin composition of the hard coat layer.

15. The laminated thin film according to claim 2, wherein content of the metal oxide particles, with respect to metal particles having an average particle diameter of 20 to 100 nm, is 50 wt % or less and 20 wt % or more of total solid content of a resin composition.

16. The laminated thin film according to claim 2, wherein the adhesion layer has a film thickness of less than 50% of an average particle diameter of the metal oxide particles exposed on the surface of the hard coat layer.

17. The laminated thin film according to claim 2, wherein the metal oxide particles are formed from $SiO_2$, and wherein the adhesion layer is formed from $SiO_x(0 \leq x < 2)$.

18. The laminated thin film according to claim 2, further comprising an anti-reflective layer on the adhesion layer in which a high refractive index layer and a low refractive index layer having a lower refractive index than the high refractive index layer are alternately laminated.

19. The laminated thin film according to claim 2, wherein the hard coat layer is formed by photopolymerizing an ultraviolet-curable resin containing a urethane (meth)acrylate oligomer, a trifunctional or higher functional (meth)acrylate monomer, a bifunctional (meth)acrylate monomer, and a photoinitiator.

* * * * *